United States Patent [19]

Kidokoro

[11] Patent Number: 5,011,321
[45] Date of Patent: Apr. 30, 1991

[54] BALL JOINT FOR STABILIZER

[75] Inventor: Susumu Kidokoro, Fuji, Japan

[73] Assignee: Gotoh Seisakusho Co., Ltd., Fuji, Japan

[21] Appl. No.: 583,822

[22] Filed: Sep. 13, 1990

[51] Int. Cl.$^5$ .............................................. F16C 11/00
[52] U.S. Cl. .................................. 403/140; 403/122; 403/134
[58] Field of Search ............... 403/140, 134, 135, 122

[56] References Cited

U.S. PATENT DOCUMENTS

| 3,695,651 | 10/1972 | Stuck | 403/140 |
| 4,256,413 | 3/1981 | Abe | 403/122 X |
| 4,758,110 | 7/1988 | Ito | 403/140 |
| 4,954,006 | 9/1990 | Suzuki et al. | 403/140 X |

*Primary Examiner*—Andrew V. Kundrat
*Attorney, Agent, or Firm*—Oblon, Spivak, McClelland, Maier & Neustadt

[57] ABSTRACT

A ball joint for a stabilizer includes a metal stud ball having a spherical head and a pillow ball seat for swingably supporting the metal stud ball. The pillow ball seat includes a plastic cylindrical seat member, a top wall portion integral with the top of the seat member, a metal cylindrical piece member fitted on the seat member, a plastic disklike cap member fitted on the top wall portion of the seat member, and means for securing the cap member to the top wall portion of the seat member. The seat member has an annular spherical concave surface formed in the inner periphery thereof. The spherical head of the stud ball is pressure-fitted in the seat member and swingably supported on the concave surface.

5 Claims, 1 Drawing Sheet

BALL JOINT FOR STABILIZER

BACKGROUND OF THE INVENTION

1. Field of the Invention

This invention relates to a ball joint for a stabilizer, which couples a wheel axle of a vehicle to a torsion bar and, more particularly, to a pillow ball seat for swingably supporting a stud ball.

2. Description of the Prior Art

With vehicles being driven at increasingly high speeds, there is a need for providing vehicles with greater stability. Specifically, it is necessary to ensure against vehicle tip-over during sharp cornering. Accordingly, many recent vehicles adopt a system in which each wheel axle is coupled to a torsion bar in order to minimize the level difference between the left and right wheels. As a member for coupling the torsion bar and wheel axle, a pair of ball joints having three-dimensional coupling means are used.

FIGS. 3 and 4 show prior art ball joints for a stabilizer, in which a stud ball 1 made of metal has a spherical head 2 fitted in a ball seat member 3 made of synthetic resin by making use of the elasticity of the member 3 so that an equator portion 4 of the spherical head 2 is swingably supported on an annular concave spherical surface 5 formed in the inner periphery of the ball seat member 3.

For the purpose of preventing the fitted spherical head 2 of the stud ball 1 from being detached from the inner periphery of the ball seat member 3 and coupling together a pair of ball joints with a connecting rod 6, in the prior art shown in FIG. 3, the ball seat member 3 is inserted downwardly into an outer cylindrical member 8 made of steel and having an inner projection 7 projecting from the lower end of the inner periphery. The lower end of the ball seat member 3 is thus supported on the inner projection 7. Then, a circular lid 9 made from steel plate material is fitted in the outer cylindrical member 8 such that its edge is supported on the top of the ball seat member 3. Thereafter, an upper portion 8' of the outer cylindrical member 8 is calked inwardly against the edge of the circular lid 9.

In the prior art ball joint shown in FIG. 4, an outer blind cylindrical member 12 made of steel and having a top wall 10 and an inner shoulder portion 11 in contact with the top of the ball seat member 3 is fitted downwardly on the ball seat member 3 so that the inner shoulder portion 11 is supported on the top of the ball seat member 3. Then, a lower end portion 12' of the outer cylindrical member 12 is calked inwardly against the lower surface of the ball seat member 3.

However, with the ball joint shown in FIG. 3, it is necessary to provide the outer cylindrical member 8 with the inner projection 7 by cold forging from steel. This operation requires a large number of steps and leads to high cost. Likewise, with the ball joint shown in FIG. 4 it is necessary to provide the outer cylindrical member 12 with the inner shoulder 11 and top wall 10 by cold forging from steel. Again this operation requires a large number of steps and leads to high cost.

Further, the assembling operation requires a calking step of inwardly bending and calking the upper end portion of the outer cylindrical member 8 in the case of the ball joint of FIG. 3 and the lower end portion of the outer cylindrical member 12 in the case of the ball joint of FIG. 4, and this leads to increased cost.

Further, with the ball joint shown in FIG. 4 in which the lower end portion of the outer cylindrical member 12 is inwardly calked, it is difficult to mount a flexible boot for keeping out dust. More specifically, the boot cannot be reliably mounted by using a groove and is therefore inevitably bonded by adhesive to the outer cylindrical member 11.

An object of the invention is to provide a pillow ball seat of a ball joint for a stabilizer, which can be manufactured readily and at low cost.

SUMMARY OF THE INVENTION

To attain the above object of the invention, there is provided a ball joint having a pillow ball seat which includes:

a cylindrical ball seat member made of synthetic resin, permitting a spherical head of a stud ball to be pressure-fitted therein and having an annular spherical concave surface formed in the inner periphery thereof for swingably supporting the spherical head thereon;

a top wall portion provided integrally at the top of the ball seat member;

a cylindrical piece member made of metal and fitted on the ball seat member;

a disklike cap member made of synthetic resin fitted on the top wall portion of the ball seat member; and means for securing the cap member to the top wall portion.

The pillow ball seat noted above according to the invention does not require any step of inwardly calking an upper or lower end portion against any cylindrical member for prevention of detachment of the ball seat member. That is, it can be produced by merely perpendicularly cutting a commercially available pipe. The ball joint can be assembled by securing the cap to the top wall portion of the ball seat member. Thus, it can be manufactured with a small number of steps and provided at low cost.

The above and other objects and features of the invention will become more apparent from the following detailed description with reference to the accompanying drawings.

DETAILED DESCRIPTION OF THE PREFERRED EMBODIMENT

Figure 1:
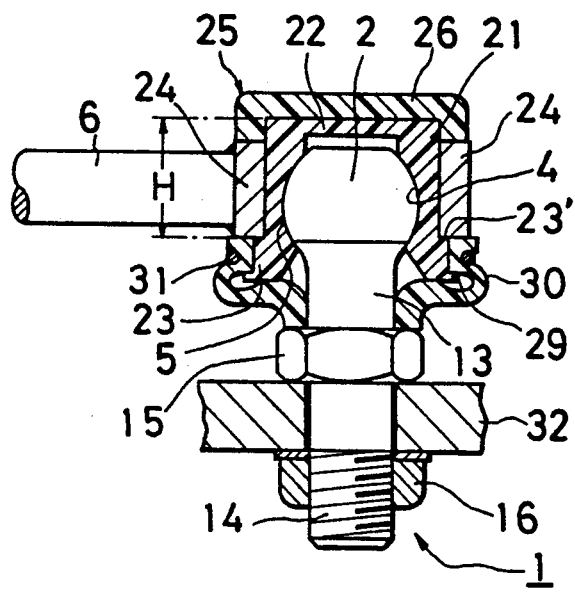
FIG. 1 is a sectional view showing one embodiment of the ball joint according to the invention.

FIG. 1 shows an embodiment of the ball joint for a stabilizer according to the invention. Reference numeral 21 designates a ball seat member made of synthetic resin and having an annular concave surface 5 for swingably supporting an equator portion 4 of a spherical head 2 of a stud ball 1. The ball seat member 21 has an integral top wall 22 and a flange-like stepped outer projection 23 projecting from the outer periphery of its lower portion.

Reference numeral 24 designates a cylindrical piece made of metal, i.e. steel, fitted on the ball seat member 21. The cylindrical piece 24 has a length or axial dimension slightly smaller than the height H of the ball seat member 21 from a step 23' of the outer projection 23 to its top.

Reference numeral 25 designates a cap member made of synthetic resin, fitted on an upper end portion of the ball seat member 21 and having a top wall 26 overlapped over the top wall 22 of the ball seat member 21.

In assembling the ball joint, the cylindrical piece 24 is first fitted downwardly on the ball seat member 21 having the spherical head 2 of the stud ball 1 swingably supported in its inner periphery such that the lower end of the cylindrical piece 24 is supported on the step 23' of the outer projection 23. Then, the cap 25 is fitted so that the lower surface of the top wall 26 of the cap 25 is secured to the top wall 22 of the ball seat member 21. The securement may be attained with a suitable adhesive or by high frequency welding.

Figure 2:
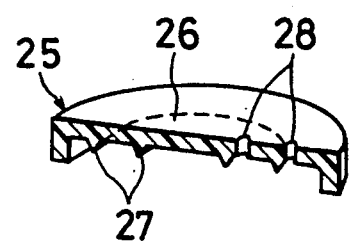
FIG. 2 is a perspective view, partly broken away, showing a cap member of the ball joint shown in FIG. 1.
Figure 3:
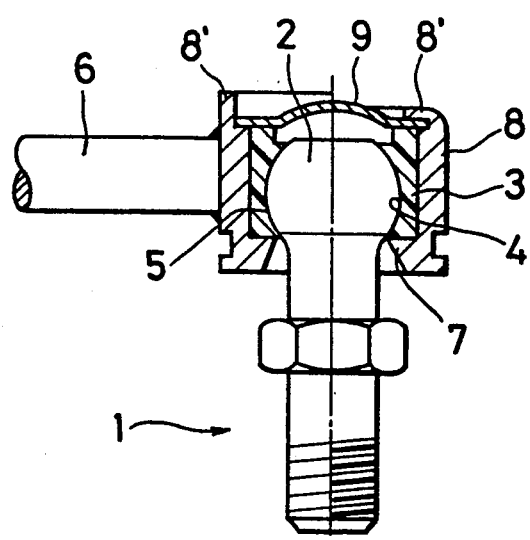
FIG. 3 is a front view, partly in section, showing a prior art ball joint.
Figure 4:
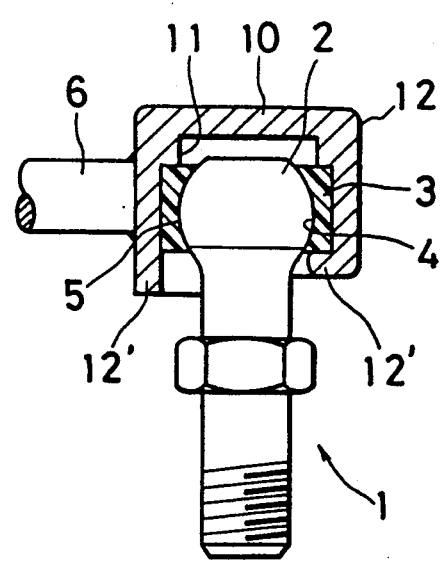
FIG. 4 is a front view, partly in section, showing another prior art ball joint.

When adopting high frequency welding, the lower surface of the top wall 26 of the cap 25 or the upper surface of the top wall 22 of the ball seat member 21 is formed with a plurality of integral annular small-height projections 27 having a mountain-like sectional profile (FIG. 2). These projections 27 are urged against the upper surface of the top wall 22 and the lower surface of the top wall 26 of cap 25 and fused away. The fused portion can be led to the outside through minute holes 28 formed in the top wall 26 of the cap 25.

Each of a pair of ball joints used in combination is connected to one end of a connecting rod 6 by welding it to the cylindrical piece 24.

When the cap 25 is secured to the ball seat member 21, the lower end of the cap 25 is in contact with the upper end of the cylindrical piece 24, and the lower end of the cylindrical piece 24 is in contact with the step 23' of the outer projection 23 of the ball seat member 21.

The outer projection 23 of the ball seat member 21 is provided with a stepped portion 29 below the step 23'. With this construction, when the ball joint is assembled, an annular recess is formed between the lower end of the cylindrical piece 24 and the stepped portion 29. A flexible dust-proof boot 30 fitted in advance on the stud ball 1 has its upper end fitted in the annular recess noted above. If necessary, an outer portion of the boot 30 is clamped using a C-shaped ring 31. By do soing, it is possible to prevent dust from entering the inside of the ball seat member 21.

Reference numeral 13 designates a neck depending from the spherical head 2 of the stud ball 1, and 14 a threaded portion extending downwardly from the neck 13. A hexagonal drive plate 15 is pressure fitted on and secured to an upper portion of the lower half of the neck 13, and a lower portion of the lower half of the neck 13 is passed through a hole formed in a wheel axle arm or torsion bar 32, and the arm or torsion bar 32 is firmly clamped against and secured to the drive plate 15 with a nut 16 screwed on the threaded portion 14.

When a force acts on the neck 13 in the direction toward the spherical head 2, there is produced a force for lifting the ball seat member 21. However, since the step 23' of the outer projection 23 of the ball seat member 21 comes into contact with the lower end of the cylindrical piece 24, the ball seat member 21 is prevented from being lifted. When a force acts on the neck 13 in the opposite direction, i.e. away from the spherical head 2, there is produced a force for extracting both the spherical head 2 and the ball seat member 21 from the cylindrical piece 24. However, since the upper surface of the top wall 22 of the ball seat member 21 is firmly secured to the lower surface of the top wall 26 of the cap 25 and since the equator portion 4 of the spherical head 2 is surrounded by the cylindrical piece 24, the ball seat member 21 is prevented from being expanded and both the spherical head 2 and the ball seat member 21 are prevented from being extracted from the cylindrical piece 24. Thus the spherical head 2 is kept retained within the ball seat member 21.

According to the invention, the outer cylindrical member 24 which is fitted on the ball seat member 21 does not have any inward projection or integral top wall, and a step of calking the upper or lower end portion of the outer cylindrical member is not required. Thus, the outer cylindrical member can be manufactured by merely perpendicularly cutting a commercially available pipe of steel or like material to a required length. This means that the outer cylindrical member may be far more easily produced than in the case of forming it by cold forging.

The ball joint thus can be assembled by fitting the cap and securing the top wall of the cap to the top wall of the ball seat member by suitable means. The ball joint thus can be manufactured in a small number of steps and provided at low cost.

What is claimed is:

1. A ball joint for a stabilizer comprising a stud ball made of metal and having a spherical head and a pillow ball seat for swingably supporting said metal stud ball, said pillow ball seat including:

a cylindrical ball seat member made of synthetic resin, permitting said spherical head of said stud ball to be pressure-fitted therein and having an annular spherical concave surface formed in the inner periphery thereof for swingably supporting said spherical head thereon;

a top wall portion provided integrally at the top of said ball seat member;

a cylindrical piece member made of metal and fitted on said ball seat member;

a disklike cap member made of synthetic resin fitted on said top wall portion of said ball seat member; and means for securing said cap member to said top wall portion.

2. The ball joint according to claim 1, wherein said cylindrical ball seat member has an outer projection projecting from the outer periphery of a lower portion, and said cylindrical piece member has a lower end in contact with said outer projection.

3. The ball joint according to claim 2, wherein said outer projection includes a step.

4. The ball joint according to claim 1, wherein said cylindrical piece member has a height smaller than that of a portion of said ball seat member from said outer projection to the top.

5. The ball joint according to claim 1, wherein said cap member secured to said top wall has a lower end portion in contact with the upper end of said cylindrical piece member.

* * * * *